(12) United States Patent
Son et al.

(10) Patent No.: US 11,378,752 B2
(45) Date of Patent: Jul. 5, 2022

(54) FANOUT OPTICAL ASSEMBLY

(71) Applicant: OPTOMIND INC., Suwon-Si (KR)

(72) Inventors: Yung Sung Son, Suwon (KR); Yong Geon Lee, Seoul (KR); Sang-shin Lee, Seoul (KR)

(73) Assignee: OPTOMIND INC., Suwon-Si (KR)

( * ) Notice: Subject to any disclaimer, the term of this patent is extended or adjusted under 35 U.S.C. 154(b) by 0 days.

(21) Appl. No.: 16/887,097

(22) Filed: May 29, 2020

(65) Prior Publication Data

US 2020/0379183 A1 Dec. 3, 2020

Related U.S. Application Data

(60) Provisional application No. 62/856,895, filed on Jun. 4, 2019.

(30) Foreign Application Priority Data

May 31, 2019 (KR) .......................... 10-2019-0064320
May 28, 2020 (KR) .......................... 10-2020-0064452

(51) Int. Cl.
*G02B 6/32* (2006.01)
(52) U.S. Cl.
CPC ..................... *G02B 6/32* (2013.01)
(58) Field of Classification Search
CPC ....................................................... G02B 6/32
USPC ............................................................ 385/33
See application file for complete search history.

(56) References Cited

U.S. PATENT DOCUMENTS

| | | | | |
|---|---|---|---|---|
| 4,753,530 A * | 6/1988 | Knight | ................... | G01N 21/64 356/73 |
| 5,117,473 A * | 5/1992 | Pan | ........................ | G02B 6/245 385/33 |
| 2002/0159728 A1* | 10/2002 | Kobayashi | ............. | G02B 23/26 385/116 |
| 2003/0087505 A1* | 5/2003 | Deane | ................... | G02B 6/4292 438/422 |
| 2004/0071407 A1* | 4/2004 | Vergeest | ............... | G02B 6/3873 385/58 |
| 2005/0069250 A1* | 3/2005 | Guy | ..................... | G02B 6/3604 385/26 |

(Continued)

*Primary Examiner* — Kaveh C Kianni
(74) *Attorney, Agent, or Firm* — Harness, Dickey & Pierce, P.L.C.

(57) ABSTRACT

An optical fiber connection apparatus is disclosed, including a first housing having first receptacle portion receiving and fixating first optical fiber bundle connecting to first optical module on the outside, and a first lens member changing shape or direction of optical signal received from the first optical module and transmitting changed optical signal to the outside or changing shape or direction of optical signal received from the outside and thereby transmitting changed optical signal to the first optical module, and further including a second housing having second receptacle portion receiving and fixating a second optical fiber bundle connecting to a second optical module on the outside, and a second lens member changing shape or direction of optical signal received from the second optical module and thereby transmitting changed optical signal or changing shape or direction of optical signal received from the outside and thereby transmitting changed optical signal to the second optical module.

7 Claims, 10 Drawing Sheets

(56) References Cited

U.S. PATENT DOCUMENTS

| | | | |
|---|---|---|---|
| 2006/0140553 A1* | 6/2006 | Theodoras, II | H04B 10/691 385/92 |
| 2008/0025676 A1* | 1/2008 | Wang | G02B 6/4246 385/92 |
| 2013/0228675 A1* | 9/2013 | Chen | G01N 21/0303 250/227.11 |
| 2014/0205247 A1* | 7/2014 | Kuo | G02B 6/383 385/89 |
| 2014/0348468 A1* | 11/2014 | Lagziel | G02B 6/4292 385/78 |
| 2016/0187595 A1* | 6/2016 | Sasaki | G02B 6/3882 385/59 |
| 2017/0261701 A1* | 9/2017 | Izawa | G02B 6/26 |
| 2017/0269315 A1* | 9/2017 | Yeh | G02B 6/2938 |
| 2017/0371114 A1* | 12/2017 | Mentovich | G02B 6/32 |
| 2017/0371115 A1* | 12/2017 | Rockman | G02B 6/4204 |
| 2020/0192040 A1* | 6/2020 | Li | G02B 6/4403 |

\* cited by examiner (a)

(b)

(a)

(b)

(c)

(a)

(b)

(c)                    (d)

(a)

(b)

(a)

(b)

(c)

FANOUT OPTICAL ASSEMBLY

CROSS-REFERENCE TO RELATED APPLICATIONS

This application claims priority to Korean Patent Application No. 10-2019-0064320 filed May 31, 2019, U.S. Provisional Application No. 62/856,895 filed Jun. 4, 2019, and Korean Patent Application No. 10-2020-0064452 filed May 28, 2020, the contents of both of which are expressly incorporated by reference herein in their entirety.

TECHNICAL FIELD

The present disclosure in some embodiments relates to an apparatus for connecting optical fibers. More particularly, the present disclosure relates to an optical fiber connection apparatus for linking optical signals between optical fiber bundles that are in connection with an optical module.

BACKGROUND

The statements in this section merely provide background information related to the present disclosure and do not necessarily constitute prior art.

A breakout cable, also referred to as a fanout cable, is a form of cable that appears to have a single cable with a plurality of lanes, which is connected to a plurality of cables with a small number of lanes. An optical cable implemented in the form of a breakout cable has both ends composed of optical modules, each basically performing a function of transmitting and receiving optical signals.

The optical module is manufactured to comply with various technical standards or technical specifications in compliance with the technical standards into, for example, a small form-factor pluggable module (hereinafter, 'SFP module') and a quad small form-factor pluggable module (hereinafter, 'QSFP module'). An SFP optical module that does not use wavelength division multiplexing (WDM) technology has a transmitter/receiver composed of one lane, and a QSFP optical module that does not use the WDM technology has a transmitter/receiver composed of four lanes, wherein the transmitter and receiver are each connected to one or four optical fibers.

The optical cable implemented in the form of a breakout cable has one end composed of an optical module having a large number of lanes and the other side composed of an optical module having a small number of lanes. For example, one cable end may be configured with one QSFP module and the other cable end with four SFP modules. As another example, one cable end may be configured with an 8-lane small module or quad small form-factor pluggable double density module (hereinafter, 'QSFP-DD') or octal small form-factor pluggable module (hereinafter, 'OSFP'), and the other cable end with eight SFP modules. When one cable end is a QSFP-DD or OSFP module that is not based on the WDM technology, the optical fibers included in the breakout cable are 16 strands including all of the transmission and reception optical fibers.

When the optical cable has one end formed of one QSFP module and the other end formed of four SFP modules, the QSFP module has a transmitter with four optical fibers connected thereto, which are optically connected to the optical fiber that is in connection with each receiver of each of the four SFP modules, while the QSFP module has a receiver with four optical fibers connected thereto, which are optically connected to the optical fiber that is in connection with each transmitter of each of the four SFP modules. In such cases, individual lanes in the transmitters or receivers may be incorrectly connected, or an unexpected optical loss may be generated in between two physically separate optical paths, due to the complicated alignment of the optical fibers connected to the transmitters and the receivers of the QSFP module and the SFP module.

SUMMARY

Accordingly, to solve these issues, the present disclosure seeks to make the optical connection easier and simpler between the transmitters and the receivers of the optical modules present on both ends of the optical cable implemented in the form of a breakout cable by providing an optical fiber connection apparatus that performs an optical connection based on alignment of the optical fibers connected to the respective optical modules.

In accordance with at least one some embodiment, the present disclosure provides an apparatus for connecting optical fibers, including a first housing and a second housing. The first housing includes a first receptacle portion and a first lens member. The first receptacle portion is configured to receive and fixate a first optical fiber bundle to be connected to a first optical module on the outside. The first lens member is configured to change a shape or a direction of an optical signal received from the first optical module and thereby transmit a changed optical signal to a first entity on the outside or to change a shape or a direction of an optical signal received from the first entity and thereby transmit a changed optical signal to the first optical module. The second housing includes a second receptacle portion and a second lens member. The second receptacle portion is configured to receive and fixate a second optical fiber bundle to be connected to a second optical module on the outside. The second lens member is configured to change a shape or a direction of an optical signal received from the second optical module and thereby transmit a changed optical signal to a second entity on the outside or to change a shape or a direction of an optical signal received from the second entity and thereby transmit a changed optical signal to the second optical module.

As described above, according to some embodiments of the present disclosure, to make the optical connection easier and simpler between the transmitters and the receivers of the optical modules implemented on both ends of the optical cable in the form of breakout cables, an optical fiber connection apparatus is provided to perform the easier and simpler optical connection based on the alignment of the optical fibers connected to the respective optical modules.

In addition, according to some embodiments of the present disclosure, the optical connection is performed based on a simplified alignment of the optical fibers, between the transmitters and the receivers of the optical modules implemented on both ends of the optical cable in the form of breakout cables to effect an increased accuracy and an increased efficiency of the optical connection.

Figure 1:
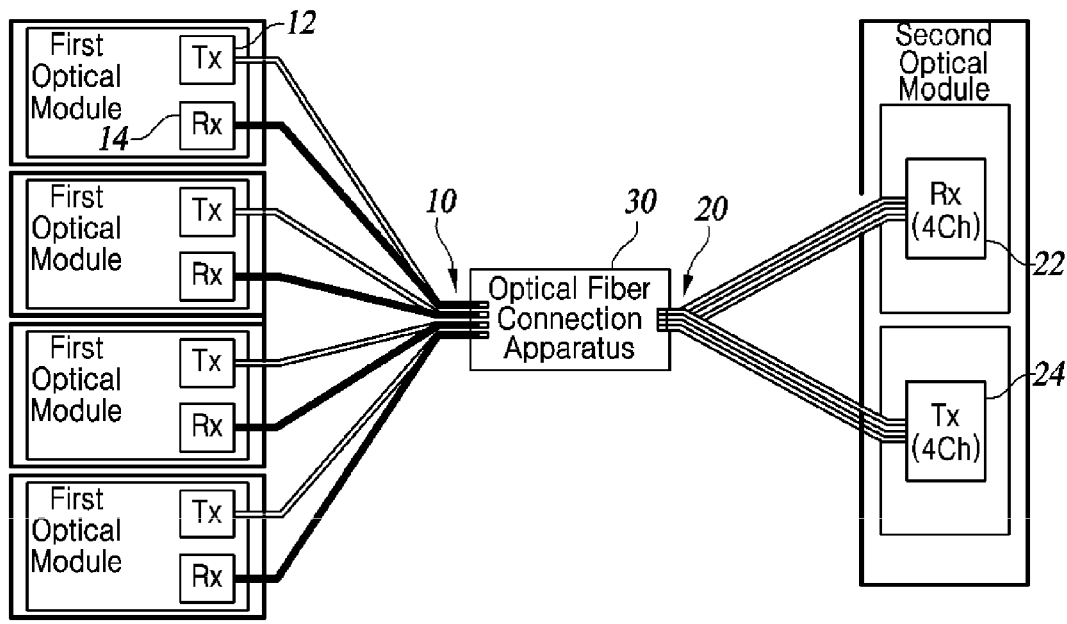
FIG. 1 is a block diagram of an optical fiber connection apparatus according to at least one embodiment of the present disclosure.

REFERENCE NUMERALS 10, 80: first optical fiber bundle
12, 82: transmitter optical fiber of a first optical module on the outside
14, 84: receiver optical fiber of a first optical module on the outside
16: first ribbon
20, 90: second optical fiber bundle
22, 92: receiver optical fiber of a second optical module on the outside
24, 94: transmitter optical fiber of a second optical module on the outside
26: second ribbon
28: third ribbon
30: optical fiber connection apparatus
300, 800: first housing
320, 820: first receptacle portion
325, 825: first insertion-stop surface
830: first strand receptacle portion
340, 840: first lens member
345, 845: second reference line
345_1, 845_1: second horizontal reference line
345_2, 845_2: second vertical reference line
360, 860: accommodation portion
380, 880: engagement hole
385, 885: first reference line
385_1, 885_1: first horizontal reference line
385_2, 885_2: first vertical reference line
400, 900: second housing
420, 920: second receptacle portion
425, 925: second insertion-stop surface
930: second strand receptacle portion
440, 940: second lens member
445, 945: fourth reference line
445_1, 945_1: fourth horizontal reference line
445_2, 945_2: fourth vertical reference line
485, 985: third reference line
485_1, 985_1: third horizontal reference line
485_2, 985_2: third vertical reference line
480, 980: engagement portion

DETAILED DESCRIPTION

Exemplary embodiments of the present disclosure are described below with reference to the accompanying drawings. In the following description, like reference numerals would rather designate like elements, although the elements are shown in different drawings. Further, in the following description of the at least one embodiment, a detailed description of known functions and configurations incorporated herein will be omitted for the purpose of clarity and for brevity.

Additionally, alphanumeric code such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto.

The following describes a first optical module on the outside as being a small form-factor pluggable module (SFP module) having a single-lane transmitter and a single-lane receiver and describes a second optical module on the outside as being a quad small form-factor pluggable module (QSFP module) having a 4-lane transmitter and a 4-lane receiver, according to at least one embodiment of the present disclosure, although the first optical module and the second optical module may have transmitters and receivers with other various numbers of lanes than the disclosed examples.

FIG. 1 is a block diagram of an optical fiber connection apparatus according to at least one embodiment of the present disclosure.

FIG. 1 shows a first optical fiber bundle 10 and a second optical fiber bundle 20 according to at least one embodiment of the present disclosure, each of which refers to a cable optically connected between at least one first optical modules on the outside and at least one second optical module on the outside. Both the first and second optical modules are located away from the optical fiber connection apparatus and are to be connected one another in aid of the optical fiber connection apparatus. Here, the number of fibers in the first optical fiber bundle 10 and the second optical fiber bundle 20 is determined by the number of lanes of the first optical modules and the second optical module, respectively.

The first optical modules and the second optical module each include a transmitter Tx and a receiver Rx, and the first optical modules may have transmitter optical fibers 12 that are connected to the second optical module at receiver optical fibers 22 thereof, and the first optical modules may also have receiver optical fibers 14 that are connected to the second optical module at transmitter optical fibers 24 thereof.

The present embodiment provides an optical fiber connection apparatus 30 that supports optical connection of at least one optical fibers between the first optical modules and the second optical module. In more detail, the optical fiber connection apparatus 30 is used to optically connect the optical fibers of the first optical modules and the optical fibers of the second optical module, for easier optical connections with high accuracy between the optical fiber bundle connected to the first optical modules and the optical fiber connected to the second optical module. Therefore, the optical fiber connection apparatus 30 can increase the efficiency of the optical connections between the at least one first optical modules and the at least one second optical module by aligning the optical fibers connected to the respective optical modules.

Figure 2:
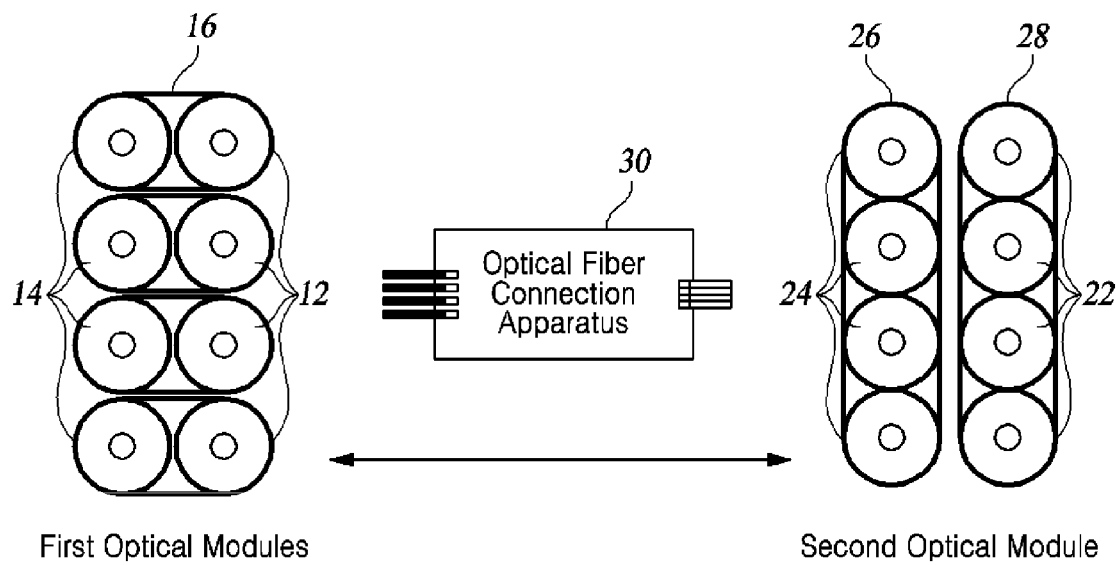
FIG. 2 is a view for explaining transmitters and receivers of a first optical module on the outside and a second optical module on the outside according to at least one embodiment of the present disclosure.

FIG. 2 is a view for explaining transmitters and receivers of the first optical module on the outside and the second optical module on the outside according to at least one embodiment of the present disclosure.

As shown in FIG. 2, for use with the optical fiber connection apparatus 30 according to at least one embodiment, the first optical module includes one transmitter Tx and one receiver Rx. Two optical fibers connected to the transmitter Tx and the receiver Rx of the first optical modules are implemented in the form of a single optical fiber ribbon. In particular, the optical fiber connection apparatus 30 is configured to be connected to four first optical modules on the outside by their respective optical fiber ribbons. Here, the four optical fiber ribbons are each referred to as a first ribbon 16.

Meanwhile, the second optical module includes a transmitter Tx and a receiver Rx which are respectively implemented with four lanes for use with the optical fiber connection apparatus 30 according to at least one embodiment. Therefore, the transmitter Tx and the receiver Rx of the second optical module are respectively connected to four optical fibers, and the optical fibers in each four-pair group are implemented as one optical fiber ribbon. In particular, the optical fiber connection apparatus 30 is configured to be connected to the single second optical module by the optical fiber ribbons that respectively hold the transmitter optical fibers 24 and the receiver optical fibers 22 of the second optical module. Here, each of the two optical fiber ribbons is referred to as a second ribbon 26 and a third ribbon 28.

Therefore, the optical fiber connection apparatus 30 according to at least one embodiment of the present disclosure can align the first ribbons 16 that are connected to the multiple first optical modules with the second ribbon 26 and the third ribbon 28 that are connected to the single second optical module.

Figure 3:
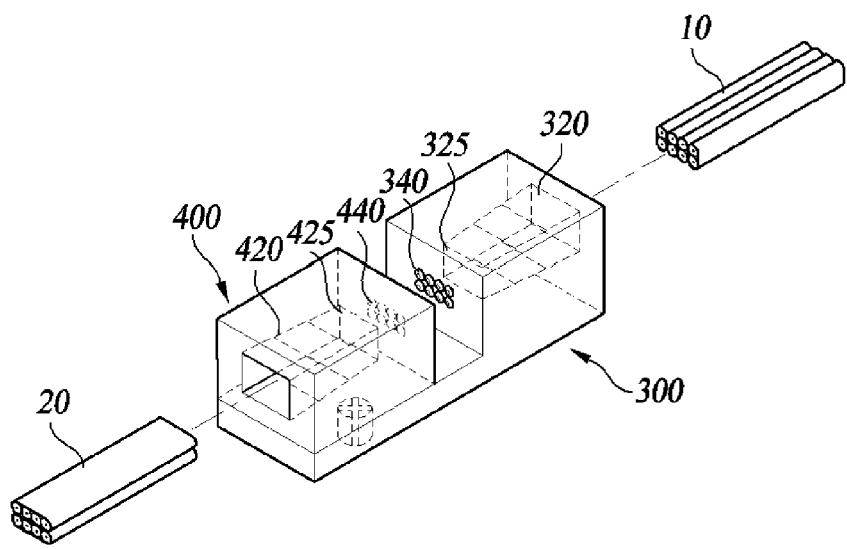
FIG. 3 is a perspective view and a plan view of an optical fiber connection apparatus according to at least one embodiment of the present disclosure.
Figure 3:
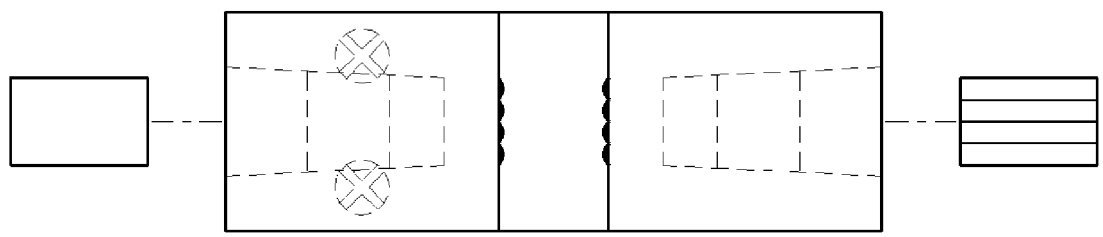

FIG. 3 is a perspective view (a) and a plan view (b) of the optical fiber connection apparatus 30 according to at least one embodiment of the present disclosure.

As shown in FIG. 2 and FIG. 3, the optical fiber connection apparatus 30 according to at least one embodiment includes all or some of a first housing 300, a second housing 400, a first receptacle portion 320, a second receptacle portion 420, the first ribbons 16, the second ribbon 26, the third ribbon 28, a first lens member 340, a medium (not shown), and a second lens member 440. The components of the optical fiber connection apparatus 30 are not necessarily limited to the detailed illustration, and there may be additions or changes according to embodiments.

The first housing 300 includes a first receptacle portion 320 and the first lens member 340. The first receptacle portion 320 serves to receive and hold the first optical fiber bundle 10 connected to the first optical module. In addition, the first lens member 340 serves to change the shape and direction of the optical signal received from the first optical module to transfer the same to a first entity on the outside or change the shape and direction of the optical signal received from the first entity to transfer the signal to the first optical module.

The second housing 400 includes a second receptacle portion 420 and the second lens member 440. The second receptacle portion 420 serves to receive and hold the second optical fiber bundle 20 connected to the second optical module. In addition, the second lens member 440 serves to change the shape and direction of the optical signal received from the second optical module and transmits the same to a second entity on the outside or change the shape and direction of the optical signal received from the second entity and transmits the signal to the second optical module.

Therefore, the first housing 300 and the second housing 400, each including the above configuration, support the optical connection between the first optical module and the second optical module. The following illustrates the detailed features of the first receptacle portion 320, the second receptacle portion 420, the first ribbon 16, the second ribbon 26, the first lens member 340, and the second lens member 440.

The first receptacle portion 320 is formed to be recessed by a predetermined depth from one side surface of the first housing 300 toward the inside thereof to establish an insertion type engagement or be insertably engaged with the first optical fiber bundle 10. Specifically, the first receptacle portion 320 may be formed in a hollow space inside the first housing 300 to facilitate accommodation of the first optical fiber bundle 10.

The cross section of the first receptacle portion 320 may be formed to be larger than the cross-sectional area of the first optical fiber bundle 10 in order to easily insert the first optical fiber bundle 10 into the one side of the first housing 300. Therefore, no significant effort is needed when the first optical fiber bundle 10 is inserted into the first housing 300.

The first receptacle portion 320 may be tapered to have a cross-sectional area decreasing toward the inside of the first housing 300 in order to establish the insertion type engagement with the first optical fiber bundle 10. Therefore, when inserted into the first receptacle portion 320, the first optical fiber bundle 10 may be easily moved toward the first lens member 340 until it is fixated to a predetermined position easily.

However, the insertion type engagement is not necessarily made to fixate the first optical fiber bundle 10 with the first receptacle portion 320, and a separate fixating means may be used to fixate the first optical fiber bundle 10 in the first receptacle portion 320.

The first receptacle portion 320 may include a first insertion-stop surface 325 that is in contact with an imaginary surface formed by end surfaces of the optical fibers included in the first optical fiber bundle 10. The first insertion-stop surface 325 comes into contact with the first optical fiber bundle 10 when the latter is insertably engaged with the first receptacle portion 320. Here, the first insertion-stop surface 325 conforms to the first optical fiber bundle 10 in terms of horizontal and vertical lengths to ensure a precise coupling between the first insertion-stop surface 325 and the first optical fiber bundle 10. For example, assuming that T is the diameter of each optical fiber, and when the first optical fiber bundle 10 is made of 4×2 optical fibers, the first insertion-stop surface 325 may have a horizontal length of 4T corresponding to the diameters of four optical fibers and a vertical length of 2T corresponding to the diameters of two optical fibers. By including the first insertion-stop surface 325, the first receptacle portion 320 can prevent the first optical fiber bundle 10 from being displaced from a position where it is to be fixated, leading to correct insertion of the first optical fiber bundle 10.

The second receptacle portion 420 is formed to be recessed by a predetermined depth from one side surface of the second housing 400 toward the inside thereof to be insertably engaged with the second optical fiber bundle 20. Hereinafter, descriptions related to the second receptacle portion 420 and the second insertion-stop surface 425 will be omitted, which are the same as those for the first receptacle portion 320 and the first insertion-stop surface 325.

The first ribbon 16 is an optical fiber bundle included in the first optical fiber bundle 10 and is formed to include one transmitter optical fiber 12 and one receiver optical fiber 14 which are disposed adjacent to one another. The first optical fiber bundle 10 according to at least one embodiment of the present disclosure may have whole-number n-multiples of the first ribbon 16 in which the multiple ribbons 16 are held together. For example, the first optical fiber bundle 10 of FIG. 3 may have, but not limited to, a 2-by-4 structure formed by placing two by four first ribbons 16 in parallel. The first optical fiber bundle 10 may be composed of a total of 2×n optical fibers.

The second ribbon 26, which is an optical fiber bundle included in the second optical fiber bundle 20, is formed by binding ones selected from the total number of optical fibers included in the second optical fiber bundle 20.

The third ribbon 28, an optical fiber bundle included in the second optical fiber bundle 20, is formed by binding the rest of the total number of optical fibers except for those included in the second ribbon 26.

For example, when the second optical fiber bundle 20 is made of whole-number n×2 multiples of the optical fibers, the second ribbon 26 may include n transmitter optical fibers 24, and the third ribbon 28 may include n receiver optical fibers 22. The second optical fiber bundle 20 of FIG. 3 may have, but not limited to, a 4-by-2 structure formed by attaching one (1) second ribbon 26 and one (1) third ribbon 28 in parallel.

Assuming that T is the diameter of each optical fiber, when the first optical fiber bundle 10 is composed of four first ribbons 16, the first optical fiber bundle 10 may have a horizontal length of 4T corresponding to the diameters of four optical fibers and a vertical length of 2T corresponding to the diameters of two optical fibers. Likewise, the second optical fiber bundle 20, which is composed of the second ribbon 26 including four transmitter optical fibers 24 and the third ribbon 28 including four receiver optical fibers 22, may have the horizontal length of 4T corresponding to the diameters of four optical fibers and the vertical length of 2T corresponding to the diameters of two optical fibers.

In this case, the number of optical fibers of the first optical fiber bundle 10 coincides with the number of optical fibers of the second optical fiber bundle 20, and the shapes of the optical fiber bundles also coincide. For example, in case that the first optical fiber bundle 10 is to have a rectangular shape composed of 2×n optical fibers, the second optical fiber bundle 20 may also have a rectangular shape composed of n×2 optical fibers.

The transmitter optical fibers 12 of the first ribbon 16 are connected to the receiver optical fibers 22 of the third ribbon 28, and the receiver optical fibers 14 of the first ribbon 16 are connected to the transmitter optical fibers 24 of the second ribbon 26. To this end, the optical fiber connection apparatus 30 according to at least one embodiment of the present disclosure may be configured so that the transmitter optical fibers 12 and the receiver optical fibers 14 of the first optical module are positioned to be in line with the receiver optical fibers 22 and the transmitter optical fibers 24 of the second optical module, respectively, along with an optical axis. Furthermore, the connection status may change from the first ribbons 16 being connected with the first housing 300 and the second ribbon 26 and the third ribbon 28 being connected to the second housing 400 to the first ribbons 16 being connected with the second housing 400, and the second ribbon 26 and the third ribbon being connected with the first housing 300 depending on the positions of the first optical module and the second optical module.

The first lens member 340 is, as with the second lens member 440, configured to enable a first optical signal transmitted from the first optical module to be received by the second optical module at the maximum efficiency after passing through the first optical fiber bundle 10, the first lens member 340, a medium, the second lens member 440, and the second optical fiber bundle 20 in the order of appearance. In addition, the first lens member 340 is, as with the second lens member 440, configured to enable a second optical signal transmitted from the second optical module to be received by the external first optical signal at the maximum efficiency after passing through the second optical fiber bundle 20, the second lens member 440, the medium, the first lens member 340, and the first optical fiber bundle 10 in the order of appearance.

An example medium can be, but not necessarily limited to, air, and it may be a vacuum or a liquid for index matching.

As described above, to receive the second optical signal at the maximum efficiency by the first optical module and receive the first optical signal at the maximum efficiency by the second optical module, the first lens member 340 may be formed on the other side of the first housing 300 and the second lens member 440 may be spaced by a preset distance along the optical axis from the first lens member 340 and formed on the other side of the second housing 400. Here, the preset distance is preferably set not to reduce the intensity of the optical signal, and it may be adjusted in consideration of the type and presence or absence of the medium.

For optical signal transmission, each receiver optical fiber of the first optical fiber bundle 10 may have one end fixated at a distance spaced apart from the first lens member 340 by a focal length of the lens included in the first lens member 340. Each receiver optical fiber of the second optical fiber bundle 20 may also have one end fixated at a distance spaced apart from the second lens member 440 by a focal length of the lens included in the second lens member 440. On the other hand, each transmitter optical fiber of the first optical fiber bundle 10 and each transmitter optical fiber of the second optical fiber bundle 20 need not have one end fixated at a distance spaced apart by a focal length as long as their transmitted optical signals are delivered to the first lens member 340 and the second lens member 440, respectively.

Meanwhile, the first lens member 340 and the second lens member 440 may be configured to have different number of lens according to the number of optical fibers of the first optical fiber bundle 10 and the second optical fiber bundle 20, respectively. Accordingly, the first lens member 340 may include first unit lenses as many as the number of optical fibers included in the first optical fiber bundle 10, and the second lens member 440 may include second unit lenses as many as the number of optical fibers included in the second optical fiber bundle 20.

In this case, the shape and the refractive index of the first unit lens are set based on the wavelength of the optical signal passing through the first unit lens, the distance between the first optical fiber bundle 10 and the first unit lens, the optical characteristics of the optical fibers included in the first optical fiber bundle 10, and the refractive index of the medium among other parameters. Similarly, the shape and refractive index of the second unit lens are set based on the wavelength of the optical signal passing through the second unit lens, the distance between the second optical fiber bundle 20 and the second unit lens, the optical characteristics of the optical fibers included in the second optical fiber bundle 20, and the refractive index of the medium among other parameters.

The lenses included in the first lens member 340 and the second lens member 440 may be collimating lenses for parallel beam of light-based optical connection, although they are not necessarily limited to this configuration. When the lenses included in the first lens member 340 and the second lens member 440 are configured as collimating lenses, light emitted from the first optical fiber bundle 10 may propagate in the direction perpendicular to the other side of the first housing 300, while the light emitted from the second optical fiber bundle 20 may travel in the direction perpendicular to the other side of the second housing 400.

Figure 4:
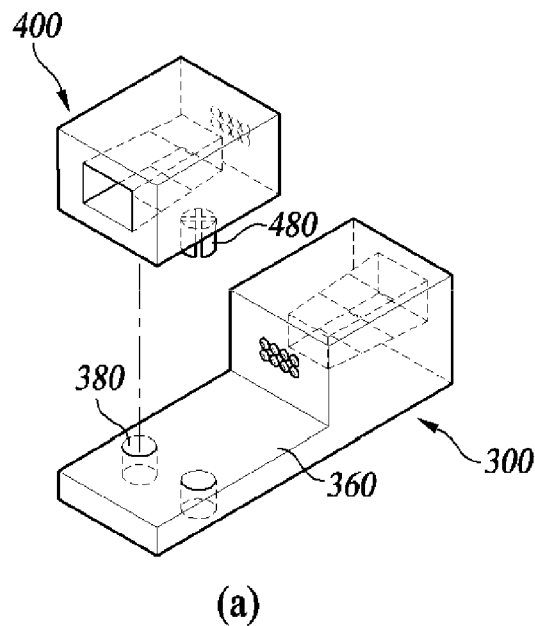
FIG. 4 is exploded perspective views of a first housing and a second housing according to at least one embodiment of the present disclosure.
Figure 4:
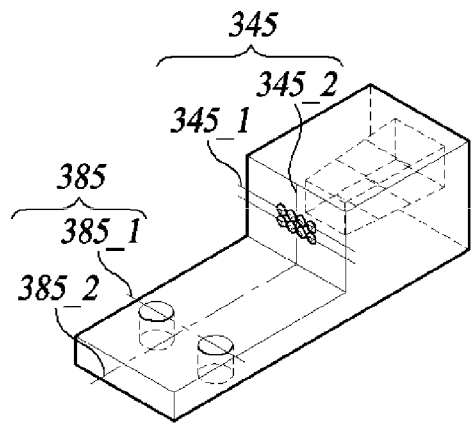
Figure 4:
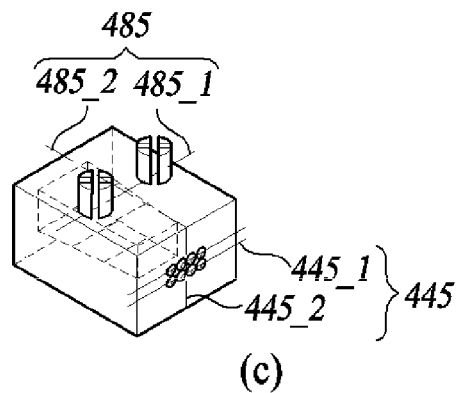

FIG. 4 is exploded perspective views of a first housing and a second housing according to at least one embodiment of the present disclosure, in which FIG. 4(a) is a view illustrating a manner in which the second housing 400 is coupled to the first housing 300. FIG. 4(b) is a view illustrating the positions in the first housing 300 where engagement holes 380 and the first lens member 340 are disposed. FIG. 4(c) is a view illustrating the positions in the second housing 400 where engagement portions 480 and the second lens member 440 are disposed.

Figure 5:
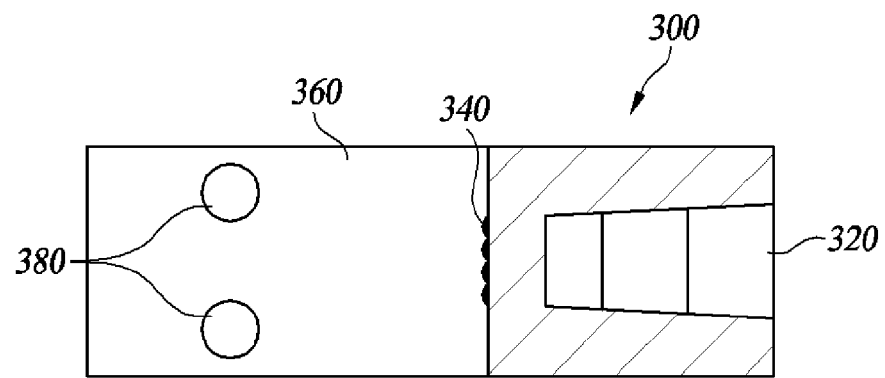
FIG. 5 is views illustrating a first housing according to at least one embodiment of the present disclosure.
Figure 5:
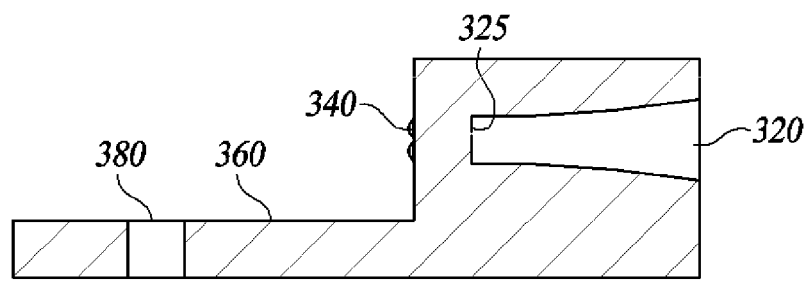
Figure 5:
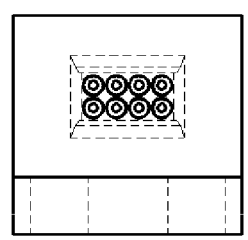
Figure 5:
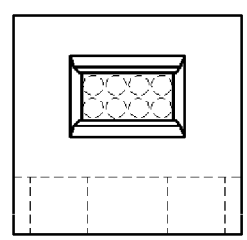

FIG. 5 is views illustrating a first housing according to at least one embodiment of the present disclosure, in which FIG. 5(a) is a cross-sectional plan view of the first housing 300. FIG. 5(b) is a cross-sectional side view of the first housing 300. FIG. 5(c) is a front view of the other side of the first housing 300. FIG. 5(d) is a front view of one side of the first housing 300.

Figure 6:
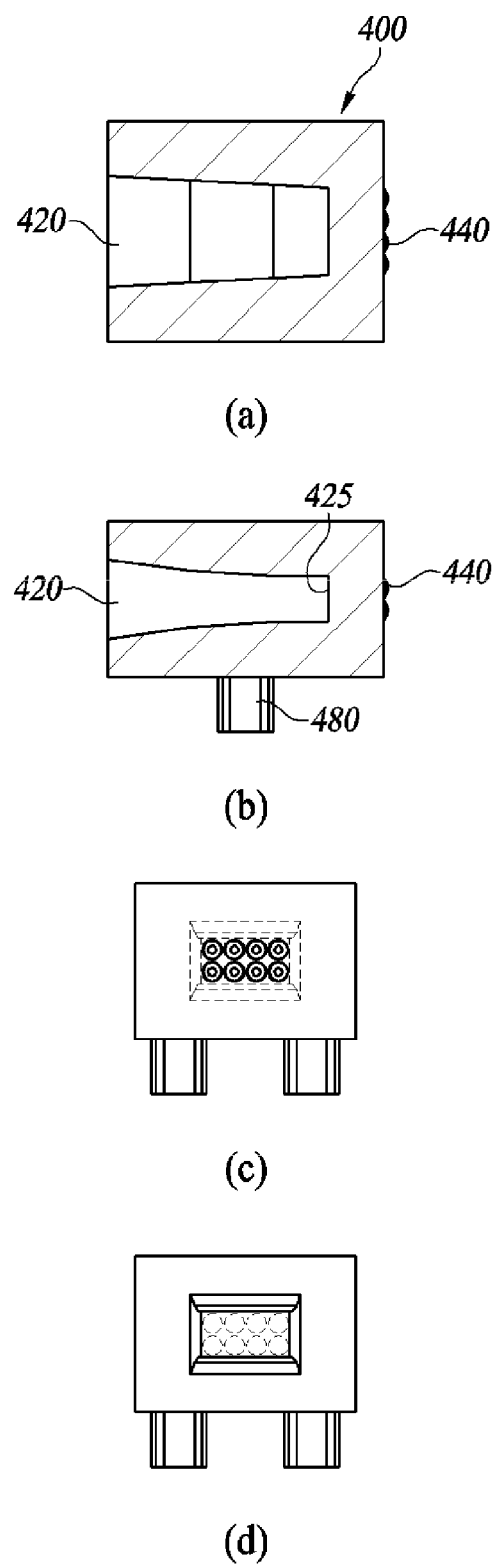
FIG. 6 is views illustrating a second housing according to at least one embodiment of the present disclosure.

FIG. 6 is views illustrating a second housing according to at least one embodiment of the present disclosure, in which FIG. 6(a) is a cross-sectional plan view of the second housing 400. FIG. 6(b) is a cross-sectional side view of the second housing 400. FIG. 6(c) is a front view of the other side of the second housing 400. FIG. 6(d) is a front view of one side of the second housing 400.

As shown in FIGS. 4 to 6, the optical fiber connection apparatus 30 according to at least one embodiment of the present disclosure includes some or all of an accommodation portion 360, the engagement portions 480, and the engagement holes 380.

The accommodation portion 360 is included in the first housing 300 and is formed to allow the second housing 400 to be seated. To have the accommodation portion 360, the first housing 300 of which cross section formed by a plane containing two vectors is 'L' shaped, wherein the two vectors include one formed in a direction in which the second housing 400 is seated and the other one formed in a direction in which the first optical fiber bundle is received in the first housing 300. However, the shape is not necessarily limited to the 'L' shape, and various other shapes are envisioned as long as the second housing 400 may be seated thereon.

When the second housing 400 is seated on the first housing 300, parts of the accommodation portion 360 may be formed with the engagement holes 380 that can be coupled with the engagement portions 480. The first housing 300 may include the engagement holes 380, while the second housing 400 may include the engagement portions 480 at the positions corresponding to the engagement holes 380.

The engagement portion 480 preferably conforms to the shape of the engagement hole 380. For example, the engagement portion 480 may be a model of, but not necessarily limited to, a cylindrical shape. One or a plurality of engagement portions 480 and one or a plurality of engagement holes 380 may be provided, and the number of engagement portions 480 is preferably the same as that of engagement holes 380.

The first housing 300 and the second housing 400 are coupled by the engagement holes 380 and the engagement portions 480 to easily position the first optical fiber bundle 10 and the second optical fiber bundle 20 to be collinear. However, the first housing 300 and the second housing 400 are not necessarily coupled by the engagement hole 380 and the engagement portion 480, and the first housing 300 and the second housing 400 may be originally manufactured to be integral with each other just as the first housing 300 and the second housing 400 are coupled together in the desired position.

As shown in FIG. 4(b), the position of the first lens member 340 is defined by first reference lines 385 and second reference lines 345 that are virtual lines. Here, the first reference lines 385 include a first horizontal reference line 385_1 and a first vertical reference line 385_2, and the second reference lines 345 include second horizontal reference lines 345_1 and a second vertical reference line 345_2.

The first vertical reference line 385_2 is set based on the first horizontal reference line 385_1. The first vertical reference line 385_2 crosses the midpoint of the first horizontal reference line 385_1 passing through the centers of the engagement holes 380. In addition, the second vertical reference line 345_2 meets with the first vertical reference line 385_2 at a right angle, and the first lens member 340 is disposed to be symmetrical with respect to the second vertical reference line 345_2. More particularly, the second horizontal reference lines 345_1 are set so that the midpoint of the second vertical reference line 345_2 is positioned at the center of the first lens member 340, thereby defining the position of the first lens member 340.

As shown in FIG. 4(c), the position of the second lens member 440 is defined by third reference lines 485 and fourth reference lines 445, which are virtual lines. Here, the third reference lines 485 include a third horizontal reference line 485_1 and a third vertical reference line 485_2, and the fourth reference lines 445 include fourth horizontal reference lines 445_1 and a fourth vertical reference line 445_2.

The third vertical reference line 485_2 is set based on the third horizontal reference line 485_1. The third vertical reference line 485_2 passes the midpoint of the third horizontal reference line 485_1 passing through the centers of the engagement portions 480. In addition, the fourth vertical reference line 445_2 meets with the third vertical reference line 485_2 at a right angle, and the second lens member 440 is disposed to be symmetrical with respect to the fourth vertical reference line 445_2. More specifically, the fourth horizontal reference lines 445_1 are set so that the midpoint of the fourth vertical reference line 445_2 is positioned at the center of the second lens member 440, whereby defining the position of the second lens member 440.

Figure 7:
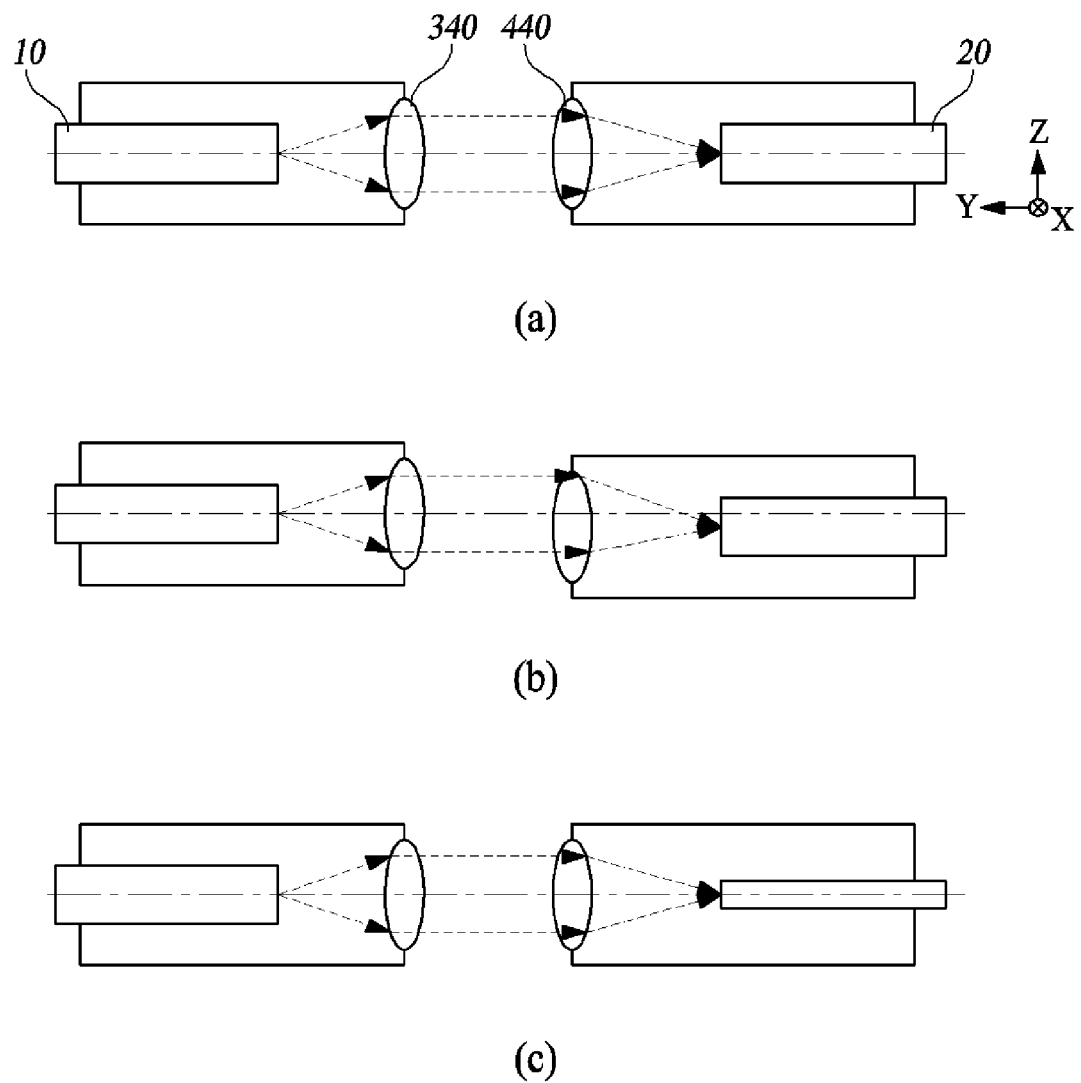
FIG. 7 is views for explaining the principle of collimating a beam used for optical connection in an optical fiber connection apparatus according to at least one embodiment of the present disclosure.

FIG. 7 is views for explaining the principle of collimating a beam used for optical connection in an optical fiber connection apparatus according to at least one embodiment of the present disclosure. FIG. 7 shows one side that represents the first optical fiber bundle 10 and the other side that represents the second optical fiber bundle 20.

FIG. 7(a) illustrates the principle of collimating optics in the basic optical connection. The first housing 300 and the second housing 400 each include a collimating lens which establishes an optical connection by changing the beam of light emitted from the optical fibers into a collimated beam, preferably a parallel beam of light. Here, the beam means a set of rays. The collimating lens is, but is not limited to, an aspherical lens.

FIG. 7(b) illustrates the principle of collimating optics in case there is a positional deviation between the first optical fiber bundle 10 and the second optical fiber bundle 20. The optical fiber connecting apparatus 30 based on a collimated beam has characteristics insensitive to an alignment error or displacement between the first optical fiber bundle 10 and the second optical fiber bundle 20. Therefore, the optical connection can be maintained even if the first optical fiber bundle 10 and the second optical fiber bundle 20 are not accurately coupled due to a displacement based on manufacturing tolerances as shown in FIG. 7B.

FIG. 7(c) illustrates the principle of collimating optics in case that the first optical fiber bundle 10 has a cross-sectional area in a shape different from that of the second optical fiber bundle 20. Since the optical fiber connection apparatus 30 needs to preserve the initial signal as long as possible, the larger the cross-sectional area of the optical fibers of the transmitter Tx is, the more advantageous. Therefore, the cross-sectional area of the optical fibers on the receiver Rx side may be equal to or smaller than that of the optical fibers on the transmitter Tx side, and in this case, the optical connection can still be maintained by using the collimating lenses.

Figure 8:
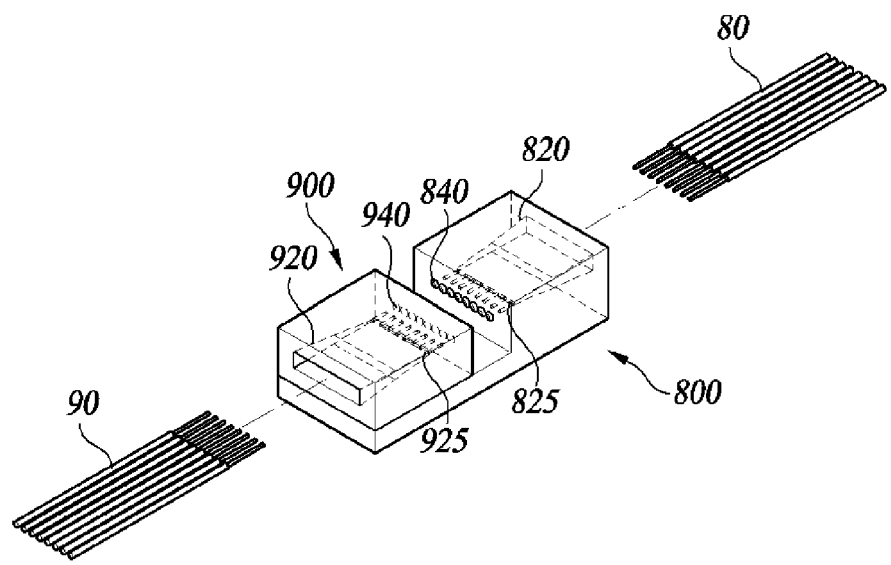
FIG. 8 is a perspective view and a plan view of an optical fiber connection apparatus according to another embodiment of the present disclosure.
Figure 8:
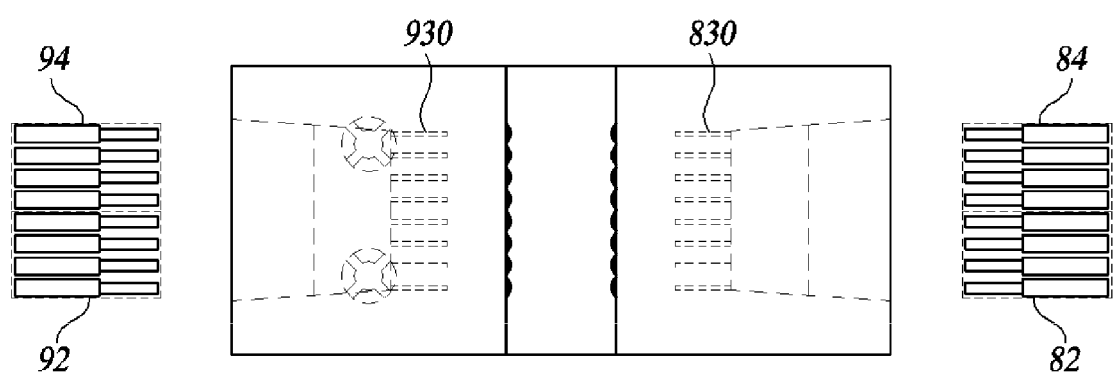

FIG. 8 is a perspective view (a) and a plan view (b) of an optical fiber connection apparatus 30 according to another embodiment of the present disclosure.

As shown in FIG. 8, the optical fiber connection apparatus 30 according to another embodiment includes all or some of a first housing 800, a second housing 900, a first receptacle portion 820, a second receptacle portion 920, a first lens member 840, and a second lens member 940. The components of the optical fiber connection apparatus 30 are not necessarily limited to those stated, and different embodiments may add or change components.

The optical fiber connection apparatus 30 according to said another embodiment is configured so that the first optical fiber bundle 80 and the second optical fiber bundle 90 do not constitute a ribbon. The optical fibers connected to the receiver Rx and the transmitter Tx of the first optical module may be arranged side by side, and they may not constitute a ribbon. Likewise, the optical fibers connected to the receiver Rx and transmitter Tx of the second optical module are also arranged side by side, and they may not constitute a ribbon. However, the ribbon is not necessarily excluded. The first optical module may have transmitter optical fibers 82 that constitute a ribbon and have receiver optical fibers 84 that also constitute a ribbon. Likewise, the second optical module may have receiver optical fibers 92 that constitute a ribbon and have transmitter optical fibers 94 that also constitute a ribbon.

In addition, the first receptacle portion 820 according to said another embodiment having a first insertion-stop surface 825 includes a first strand receptacle portion 830 protruding from the first insertion-stop surface 825 toward where the first lens member 840 is located, and the second receptacle portion 920 having a second insertion-stop surface 925 includes a second strand receptacle portion 930 protruding from the second insertion-stop surface 925 toward where the second lens member 940 is located. When fiber bundles are provided without a ribbon, it may be difficult to couple the first fiber bundle 80 and the second fiber bundle 90 to the first receptacle portion 820 and the second receptacle portion 920, respectively. To resolve the difficulty, it is preferable to incorporate the first strand receptacle portion 830 and the second strand receptacle portion 930 for allowing each of the optical fiber strands to be fixated at predetermined positions.

The first lens member 840 and the second lens member 940 of the optical fiber connection apparatus 30 according to said another embodiment of the present disclosure may be implemented in the form of 1×8 instead of 2×4. The optical fiber connection apparatus 30 according to said another embodiment may vary the first lens member 840 and the second lens member 940 to be implemented conforming to the first optical fiber bundle 80 and the second optical fiber bundle 90. In turn, the first insertion-stop surface 825 and the second insertion-stop surface 925 may be varied conforming to the first optical fiber bundle 80 and the second optical fiber bundle 90.

The number of optical fibers of the first optical fiber bundle 80 and the number of optical fibers of second optical fiber bundles 90 coincide, and the shapes of the bundles also coincide. When the first optical fiber bundle 80 has a rectangular shape composed of 1×n optical fibers, the second optical fiber bundle 90 may also be the rectangular shape composed of 1×n optical fibers. Here, the transmitter optical fibers 82 of the first optical module are connected to the receiver optical fibers 92 of the second optical module, and the receiver optical fibers 84 of the first optical module are connected to the transmitter optical fibers 94 of the second optical module. The first optical fiber bundle 80 and the second optical fiber bundle 90 may exchange their positions with respect to the first optical module and the second optical module so that they possibly switch places between the first housing 800 and the second housing 900.

Except as described above, the first housing 800, the second housing 900, the first receptacle portion 820, the second receptacle portion 920, the first lens member 840, the medium, and the second lens member 940 according to the another embodiment of the present disclosure are equivalent to the first housing 300, the second housing 400, the first receptacle portion 320, the second receptacle portion 420, the first lens member 340, the medium, and the second lens member 440 according to the at least one embodiment as described above.

Figure 9:
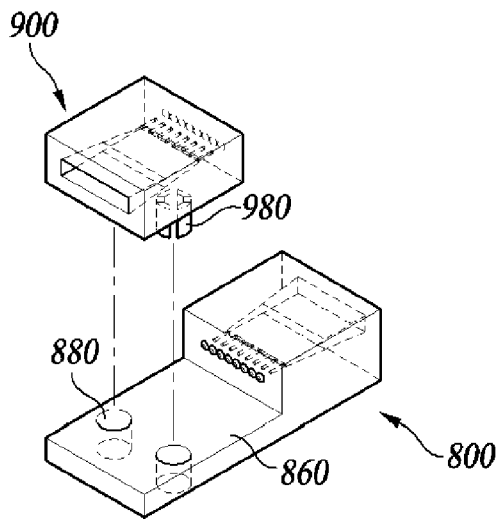
FIG. 9 is exploded perspective views of a first housing and a second housing according to another embodiment of the present disclosure.
Figure 9:
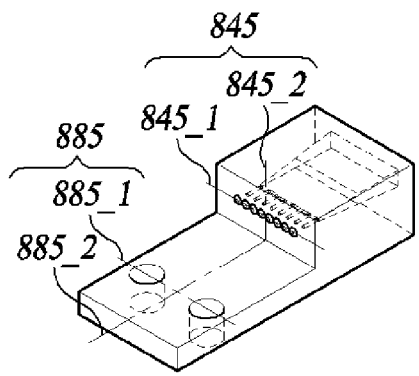
Figure 9:
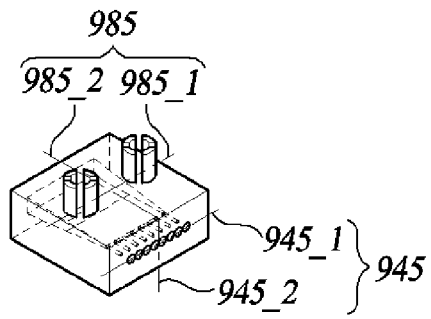

FIG. 9 is exploded perspective views of a first housing and a second housing according to another embodiment of the present disclosure wherein FIG. 9(a) illustrates a manner in which the second housing 900 is coupled to the first housing 800. FIG. 9(b) illustrates the positions in the first housing 800 where engagement holes 880 and the first lens member 840 are disposed. FIG. 9(c) illustrates the positions in the second housing 900 where engagement portions 980 and the second lens member 940 are disposed.

Figure 10:
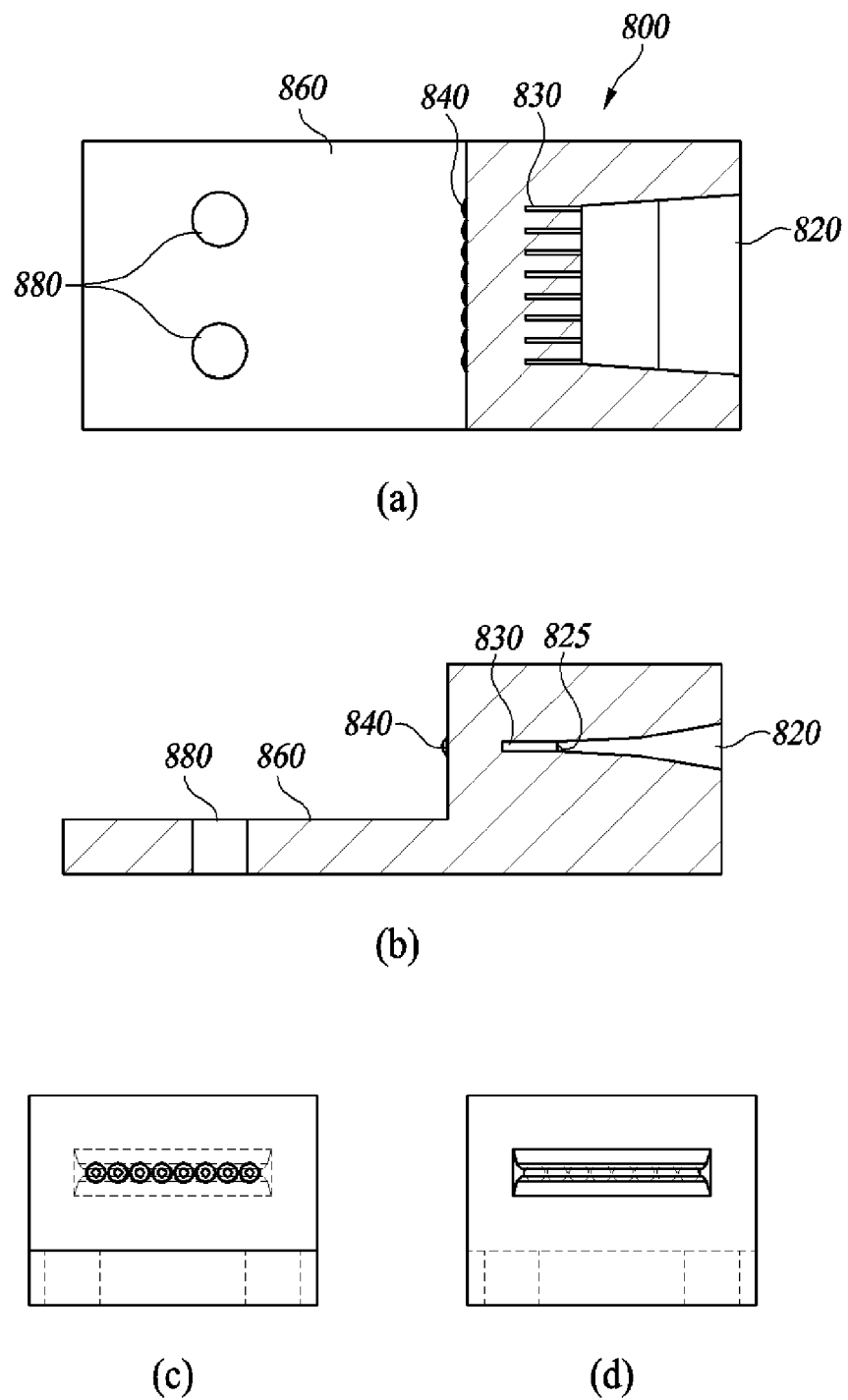
FIG. 10 is views illustrating a first housing according to another embodiment of the present disclosure.

FIG. 10 is views illustrating the first housing according to said another embodiment of the present disclosure wherein FIG. 10(a) is a cross-sectional plan view of the first housing 800. FIG. 10(b) is a side sectional view of the first housing 800. FIG. 10(c) is a front view of the other side of the first housing 800. FIG. 10(d) is a front view of one side of the first housing 800.

Figure 11:
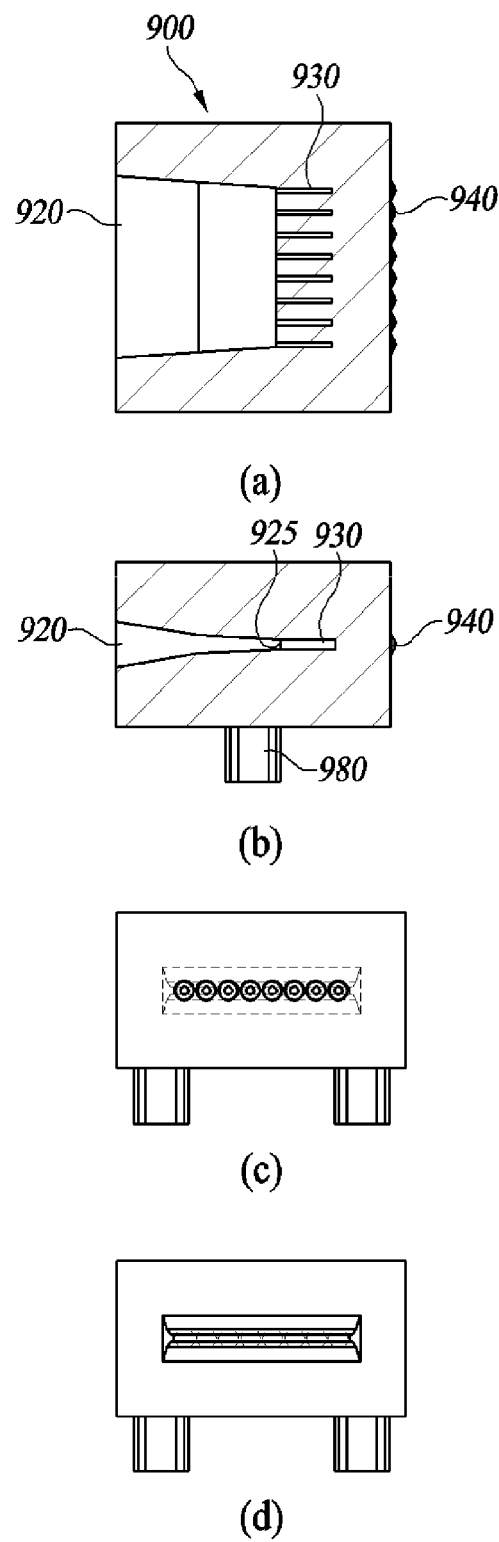
FIG. 11 is views illustrating a second housing according to another embodiment of the present disclosure.

FIG. 11 is views illustrating the second housing according to said another embodiment of the present disclosure wherein FIG. 11(a) is a cross-sectional plan view of the second housing 900. FIG. 11(b) is a cross-sectional side view of the second housing 900. FIG. 11(c) is a front view of the other side of the second housing 900. FIG. 11(d) is a front view of one side of the second housing 900.

As shown in FIGS. 9 to 11, the optical fiber connection apparatus 30 according to said another embodiment of the present disclosure includes all or some of the accommodation portion 860, the engagement portions 980, and the engagement holes 880.

The accommodation portion 860, the engagement portions 980 and the engagement holes 880 according to said another embodiment are equivalent to the accommodation portion 360, the engagement portions 480 and the engagement holes 380 according to the at least one embodiment as described above.

Further, the first reference line 885 and the second reference line 845 for defining the position of the first lens member 840 according to said another embodiment are equivalent to the first reference line 385 and the second reference line 345 according to the at least one embodiment as described above. The third reference line 985 and the fourth reference line 945 for defining the position of the second lens member 940 according to said another embodiment are equivalent to the third reference line 485 and the fourth reference line 445 according to the at least one embodiment as described above.

As described above, the optical fiber connection apparatus 30 according to at least one embodiment of the present disclosure provides an optical connection based on the alignment of the optical fibers connected to the optical modules, thereby rendering the optical connection easier and simpler between the transmitters and the receivers of the optical modules present on both ends of the optical cable implemented in the form of a breakout cable. In addition, the optical fiber connection apparatus 30 according to at least one embodiment of the present disclosure provides advantageous effects including an increased accuracy and an increase efficiency of the optical connection since the optical connection is performed based on a simplified alignment of the optical fibers, between the transmitters and the receivers of the optical modules present on both ends of the optical cable implemented in the form of a breakout cable.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for connecting optical fibers, comprising:
   a first housing, comprising:
      a first receptacle portion configured to receive and fixate a first optical fiber bundle to be connected to a first optical module on the outside, and
      a first lens member configured to change a shape or a direction of an optical signal received from the first optical module and thereby transmit a changed optical signal to a first entity on the outside or to change a shape or a direction of an optical signal received from the first entity and thereby transmit a changed optical signal to the first optical module; and
   a second housing, comprising:
      a second receptacle portion configured to receive and fixate a second optical fiber bundle to be connected to a second optical module on the outside, and
      a second lens member configured to change a shape or a direction of an optical signal received from the second optical module and thereby transmit a changed optical signal to a second entity on the outside or to change a shape or a direction of an optical signal received from the second entity and thereby transmit a changed optical signal to the second optical module,
   wherein the first housing comprises an accommodation portion configured to allow the second housing to be seated,
   the first housing of which cross section formed by a plane containing two vectors is 'L' shaped, wherein the two vectors include one formed in a direction in which the second housing is seated and the other one formed in a direction in which the first optical fiber bundle is received in the first housing, and
   the first housing further includes at least one or more engagement holes at parts of the accommodation portion of the first housing, and the second housing further includes at least one or more engagement portions at positions corresponding to the engagement holes to allow the engagement holes to be coupled with the engagement portions when the second housing is seated on the first housing.

2. The apparatus of claim 1, wherein
   the first receptacle portion is formed to be recessed by a predetermined depth from one side of the first housing toward the inside of the first housing to establish an insertion type engagement with the first optical fiber bundle, and
   the second receptacle portion is formed to be recessed by a predetermined depth from one side of the second housing toward the inside of the second housing to establish an insertion type engagement with the second optical fiber bundle.

3. The apparatus of claim 2, wherein the first lens member or the second lens member is configured
   to enable a first optical signal transmitted from the first optical module to be received by the second optical module at a maximum efficiency after passing through the first optical fiber bundle, the first lens member, a medium, the second lens member, and the second optical fiber bundle in an order of appearance, and
   to enable a second optical signal transmitted from the second optical module to be received by the external first optical signal at a maximum efficiency after passing through the second optical fiber bundle, the second lens member, the medium, the first lens member, and the second optical fiber bundle in an order of appearance.

4. The apparatus of claim 3, wherein
   the first lens member comprises first unit lenses as many as optical fibers included in the first optical fiber bundle, the first unit lenses each having a shape and a refractive index set based on a wavelength of an optical signal passing through a first unit lens, a distance between the first optical fiber bundle and the first unit lens, optical characteristics of the optical fibers included in the first optical fiber bundle, and a refractive index of the medium, and
   the second lens member comprises second unit lenses as many as optical fibers included in the second optical fiber bundle, the second unit lenses each having a shape and a refractive index set based on a wavelength of an optical signal passing through a second unit lens, a distance between the second optical fiber bundle and the second unit lens, optical characteristics of the optical fibers included in the second optical fiber bundle, and the refractive index of the medium.

5. The apparatus of claim 2, wherein
the first receptacle portion comprises a first insertion-stop surface that is in contact with an imaginary surface formed by end surfaces of optical fibers included in the first optical fiber bundle, and
the second receptacle portion comprises a second insertion-stop surface that is in contact with an imaginary surface formed by end surfaces of optical fibers included in the second optical fiber bundle.

6. The apparatus of claim 1, wherein
the first optical fiber bundle comprises:
   at least one first ribbon formed to include one transmitter optical fiber and one receiver optical fiber which are disposed adjacent to one another; and
the second optical fiber bundle comprises:
   a second ribbon formed to include ones selected from a total number of optical fibers included in the second optical fiber bundle and a third ribbon formed to include the rest of the total number of the optical fibers.

7. The apparatus of claim 1, wherein
the transmitter optical fibers and the receiver optical fibers of the first optical module are positioned to be in line with the receiver optical fibers and the transmitter optical fibers of the second optical module, respectively, along with an optical axis.

\* \* \* \* \*